US012152424B2

(12) United States Patent
Balbo Di Vinadio et al.

(10) Patent No.: US 12,152,424 B2
(45) Date of Patent: Nov. 26, 2024

(54) GUIDE FOR A LIFTABLE SLIDING LEAF

(71) Applicant: SAVIO S.p.A., Chiusa San Michele (IT)

(72) Inventors: Aimone Balbo Di Vinadio, Chiusa San Michele (IT); Antonio Bellei, Carpi (IT)

(73) Assignee: SAVIO S.p.A, Turin (IT)

( * ) Notice: Subject to any disclaimer, the term of this patent is extended or adjusted under 35 U.S.C. 154(b) by 345 days.

(21) Appl. No.: 15/769,814

(22) PCT Filed: Oct. 24, 2016

(86) PCT No.: PCT/IB2016/056375
§ 371 (c)(1),
(2) Date: Apr. 20, 2018

(87) PCT Pub. No.: WO2017/068554
PCT Pub. Date: Apr. 27, 2017

(65) Prior Publication Data

US 2019/0390495 A1 Dec. 26, 2019

(30) Foreign Application Priority Data

Oct. 23, 2015 (IT) ........................ 102015000064782
Oct. 23, 2015 (IT) ........................ 102015000064931

(51) Int. Cl.
*E05D 15/56* (2006.01)
*E05D 15/06* (2006.01)

(52) U.S. Cl.
CPC ....... *E05D 15/565* (2013.01); *E05D 15/0626* (2013.01); *E05D 2015/0695* (2013.01); *E05Y 2201/684* (2013.01); *E05Y 2900/148* (2013.01); *E05Y 2900/15* (2013.01)

(58) Field of Classification Search
CPC ...................... E05D 15/565; E05D 2015/0695
See application file for complete search history.

(56) References Cited

U.S. PATENT DOCUMENTS 1,408,302 A * 2/1922 Ambrose ................ A62C 2/18 49/1
1,528,861 A * 3/1925 Ury ...................... B61D 19/005 49/229
1,555,317 A * 9/1925 Harold ................. B61D 19/002 16/96 R (Continued)

FOREIGN PATENT DOCUMENTS

DE 1808276 A1 11/1968
DE 1559725 B1 * 2/1970 ........... E05D 15/565

(Continued)

OTHER PUBLICATIONS

International Search Report and Written Opinion for PCT/IB2016/056375 mailed Feb. 16, 2017.

*Primary Examiner* — Catherine A Kelly
(74) *Attorney, Agent, or Firm* — Thomas | Horstemeyer, LLP

(57) ABSTRACT

A guide (10) for a liftable sliding leaf comprises at least two guide bars (14, 16), a first bar (14) of which can be connected movably to a support (24), fixed with respect to the leaf, and a second bar (16) can be connected integrally to a top part (12) of the leaf (11) so that both the bars (14, 16) are movable in a vertical plane.

12 Claims, 5 Drawing Sheets

(56) References Cited

U.S. PATENT DOCUMENTS

| | | | | | |
|---|---|---|---|---|---|
| 2,728,101 | A * | 12/1955 | Thorp | E05D 15/0643 | 16/88 |
| 3,318,048 | A * | 5/1967 | Hal | E05D 15/1021 | 49/223 |
| 3,473,266 | A * | 10/1969 | Miller | E05D 15/06 | 49/504 |
| 3,886,685 | A * | 6/1975 | Riphagen | E05D 15/565 | 49/209 |
| 4,731,950 | A * | 3/1988 | Ullner | E05F 1/008 | 49/221 |
| 4,936,049 | A * | 6/1990 | Hansen | E06B 3/4618 | 49/235 |
| 5,566,505 | A * | 10/1996 | Kamezaki | E05D 15/1021 | 49/225 |
| 6,289,643 | B1 * | 9/2001 | Bonar | E06B 3/4654 | 49/505 |
| 7,752,810 | B2 * | 7/2010 | Haab | E05D 15/0621 | 49/404 |
| 2019/0153763 | A1 * | 5/2019 | Balbo Di Vinadio | E05D 15/0626 | |

FOREIGN PATENT DOCUMENTS

| | | | | |
|---|---|---|---|---|
| DE | 3224395 | A1 | 1/1984 | |
| DE | 20121499 | U1 | 12/2002 | |
| DE | 102013218948 | A1 | 3/2015 | |
| EP | 1908908 | A2 | 4/2008 | |
| EP | 2781678 | A2 | 9/2014 | |
| FR | 2726314 | A1 * | 5/1996 | E05D 15/1021 |
| NL | 9201184 | A * | 2/1994 | E04B 2/827 |

* cited by examiner

GUIDE FOR A LIFTABLE SLIDING LEAF

CROSS-REFERENCE TO RELATED APPLICATION

This application is the 35 U.S.C. § 371 national stage application of PCT Application No. PCT/IB2016/056375, filed Oct. 24, 2016, where the PCT claims priority to and the benefit of Italian Patent Application No. 102015000064782, filed on Oct. 23, 2015, and Italian Patent Application No. 102018000064931, filed on Oct. 23, 2015, all of which are herein incorporated by reference in their entireties.

TECHNICAL SECTOR

The present invention is classifiable, in general terms, within the sector of doors and windows and fixtures; the invention relates to a guide for a liftable sliding leaf.

PRIOR ART

It is known to use sliding doors or windows for applications in particular in the civil construction sector.

Such doors or windows, in particular those mounted in the external perimetral walls of a dwelling, comprise sliding leaves which, when in the closed position, rest on the ground. In order to activate sliding of the leaf, the leaf must be lifted from the ground and positioned on suitable guides which allow lateral sliding thereof.

The conventional solution of positioning the sliding guides on the ground has many drawbacks, for example the risk of tripping on the raised profile of the guide, or the need for frequent maintenance and careful cleaning to remove the dirt which collects inside the groove.

To solve these and other problems, the solution of mounting the sliding guides on the top part of the door or window has been considered in the prior art. In this case, however, the leaf cannot be rested on the ground and therefore remains always in a suspended position. Consequently, the sliding leaf cannot be fixed in position during its lateral sliding movement.

Therefore, although the solution of mounting the guide of the sliding leaf on the top part of the counterframe is able to achieve advantages in terms of simpler assembly of the structure and optionally drainage of the water from the exterior (which does not collect in the bottom track), a structure thus designed is subject to the problem that there are no suitable solutions for fixing it in position.

In this way, such a configuration negatively affects the safety and usability of the sliding door, also in terms of its reliability and its resistance to break-in.

Moreover, the possibility for the leaf to rest on the ground causes compression of the seals, increasing the performance thereof in terms of water-tightness and sealing action against the external air; however, a guide which slides along the top according to the prior art is unable to benefit from this insulating effect.

In addition, the fact that the leaf remains continuously suspended increases the stresses acting on the top guides, negatively affecting the working life of the manufactured product; on the other hand, if the leaf were able to rest on the ground, its weight would be transmitted to the ground, without stressing the guiding parts.

SUMMARY OF THE INVENTION

One object of the present invention is to overcome the aforementioned problems.

In order to achieve this result, a door provided with liftable sliding leaves is supported by a guide located on the top edge of the leaf.

In this way, by positioning the guide on the top edge of the liftable sliding leaf, the advantages of not having the guide located on the surface of the ground (with the beneficial effects mentioned above) and the advantage of being able to lock the movement of the leaf by causing it to rest on the ground, for example when in the closed position, are simultaneously obtained.

More specifically, the guide for the sliding leaf is configured so as to be divided into two bars, movable relative to each other.

In particular, a first bar may be connected to a fixed support, relative to which it may be moved closer or further away, so as to lift the bar relative to the ground (for example, by means of a lever mechanism which makes use of a tie-rod not forming part of the present invention). When lifted, the first bar engages the second bar which is in turn fixed to the sliding leaf. Lifting of the second movable bar causes the movement also, in the vertical plane, of the leaf which is therefore lifted from the ground. Once lifted, the sliding leaf is therefore free to slide on the track formed in the second bar associated with it.

The advantage, as mentioned, is that of providing a solution which is able to combine the possibility of placing the guide on the top edge of the door with the technical benefits of causing the leaf to rest on the ground.

The aforementioned and other objects and advantages are achieved, according to an aspect of the invention, by a guide for a liftable sliding leaf, a liftable leaf sliding on a guide and a door or window comprising such a leaf, having the characteristic features defined in the attached claims.

BRIEF DESCRIPTION OF THE DRAWINGS

The functional and structural characteristics of a number of preferred embodiments of a guide for a liftable sliding leaf, a liftable leaf sliding on a guide, and a door or window comprising this leaf, according to the invention, will now be described. Reference is made to the attached drawings in which.

DETAILED DESCRIPTION

Figure 1:
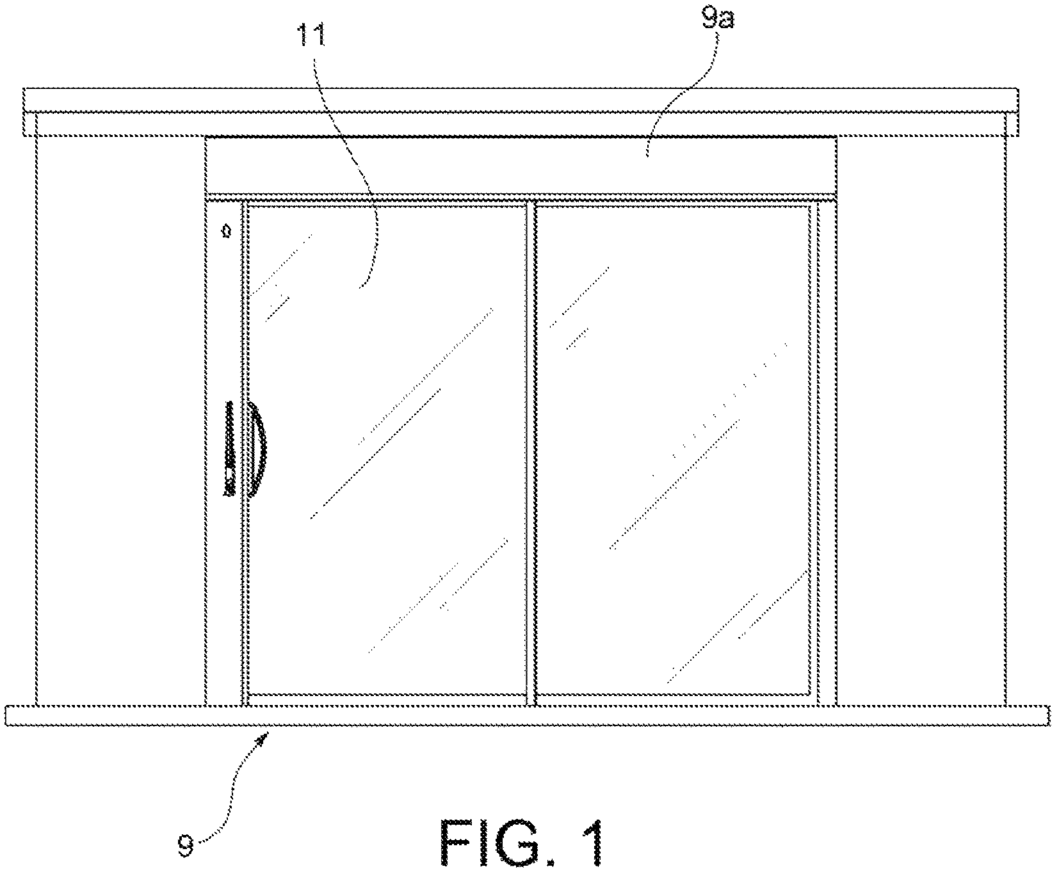
FIG. 1 is a schematic front view of a sliding door.

Before explaining in detail a plurality of embodiments of the invention, it should be made clear that the invention is not limited, in terms of its application, to the constructional details and the configuration of the components described in the description below or illustrated in the drawings. The invention may assume other embodiments and be implemented or realized in practice in different ways. It should also be understood that the phraseology and terminology have a descriptive function and should not be regarded as being limiting.

With reference initially to FIG. 1, a sliding door or window 9 comprises one or more liftable sliding leaves 11. These leaves 11, in addition to sliding laterally along a vertical plane, rest substantially on the ground when they are in a given position (for example, closed position). The expression “resting on the ground” embraces all the technical options whereby the leaf 11 rests on its bottom edge, so as to remain locked in position. In order to allow sliding of the leaves 11 they must therefore be lifted (to release them) and pushed sideways.

Figure 2:
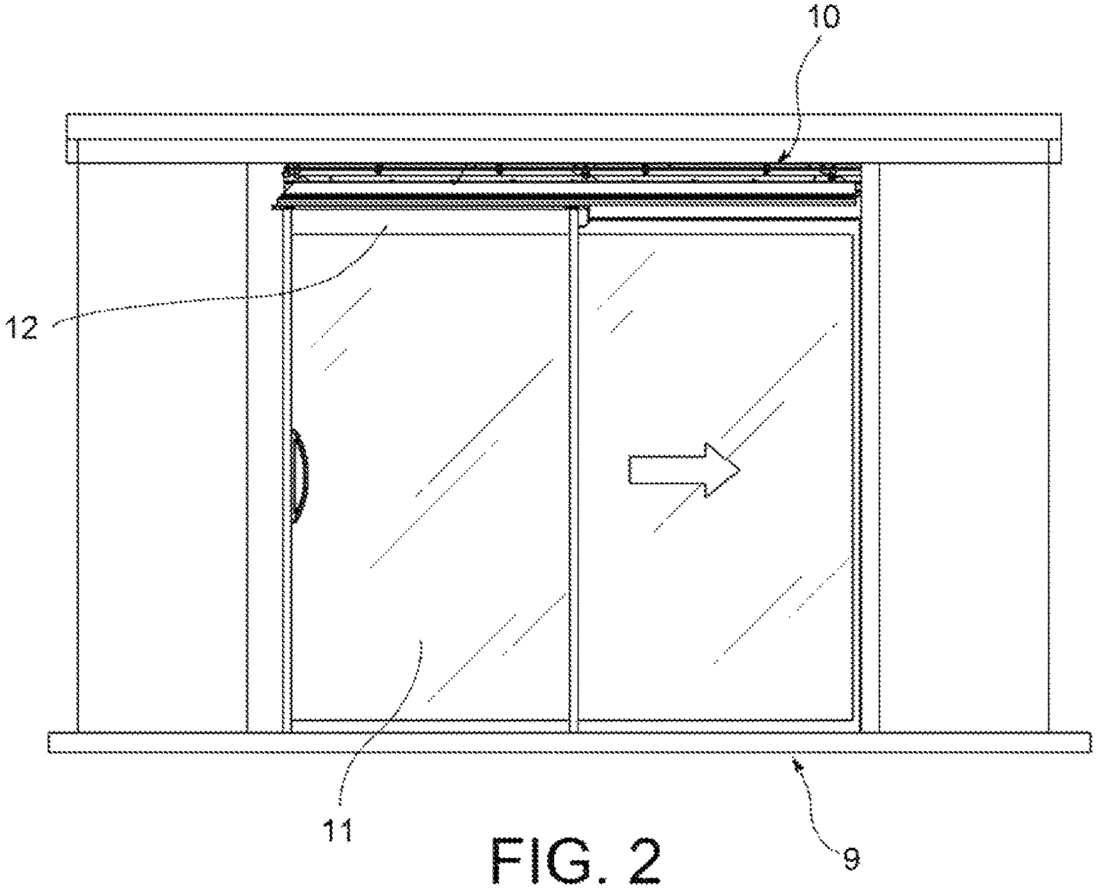
FIG. 2 shows a schematic front view of a sliding door which comprises a guide located on the top edge of the leaves, according to an embodiment of the present invention.

From FIG. 2 it can be seen that these liftable sliding leaves 11 are slidable along a guide 10 located on a top part or edge 12 of the leaf 11. The guide 10 thus located may be covered, for aesthetic and protective reasons, for example by a panel of a counterframe 9*a*.

The guide 10 comprises at least two guide bars 14, 16, both movable in a vertical plane.

One of the two guide bars 14 can be connected and supported (directly or indirectly) in a movable manner by means of a fixed support 24 (fixed with respect to the sliding leaf) which may be the top edge of the counterframe 9*a*, fastened to the wall in which the door or window 9 is located, or, as will be understood more clearly in the continuation of the description, another element associated with it. The other guide bar 16 will instead be connected to, and movable integrally with, the liftable sliding leaf 11.

For example, the first guide bar 14 (the bar which is not fixed to the liftable sliding leaf 11) may be pivoted between a lowered position (in which the leaf 11 rests on the ground and is therefore fixed in place) and a lifted position (in which the leaf 11 is lifted and is free to slide laterally). In order to obtain this effect, a tie-rod 15 may for example be used (schematically shown in FIGS. 3 and 4 by means of a broken-line profile, but not forming part of the present invention), said tie-rod being connected to this first bar 14.

Conveniently, the two bars 14, 16 have an L-shaped or C-shaped cross-section.

Furthermore, the bars 14, 16 may be substantially mutually complementary, or, as in the examples shown, one bar may be aligned vertically and in an antisymmetric manner with respect to the other one. In other words, the orientation of one bar 14 may be schematically represented as a rotation of the other bar 16 first about a vertical axis and then about a horizontal axis, after which the two bars 14, 16 are aligned vertically (as visible in FIGS. 3 and 4).

In the entire present description and in the claims, the terms and the expressions indicating positions and orientations, such as “vertical”, “horizontal”, “longitudinal” or “transverse”, are to be understood in relation to the direction of the height of the leaf 11.

According to an embodiment of the invention, the bars 14, 16 may be moved towards each other in a vertical plane.

Figure 3:
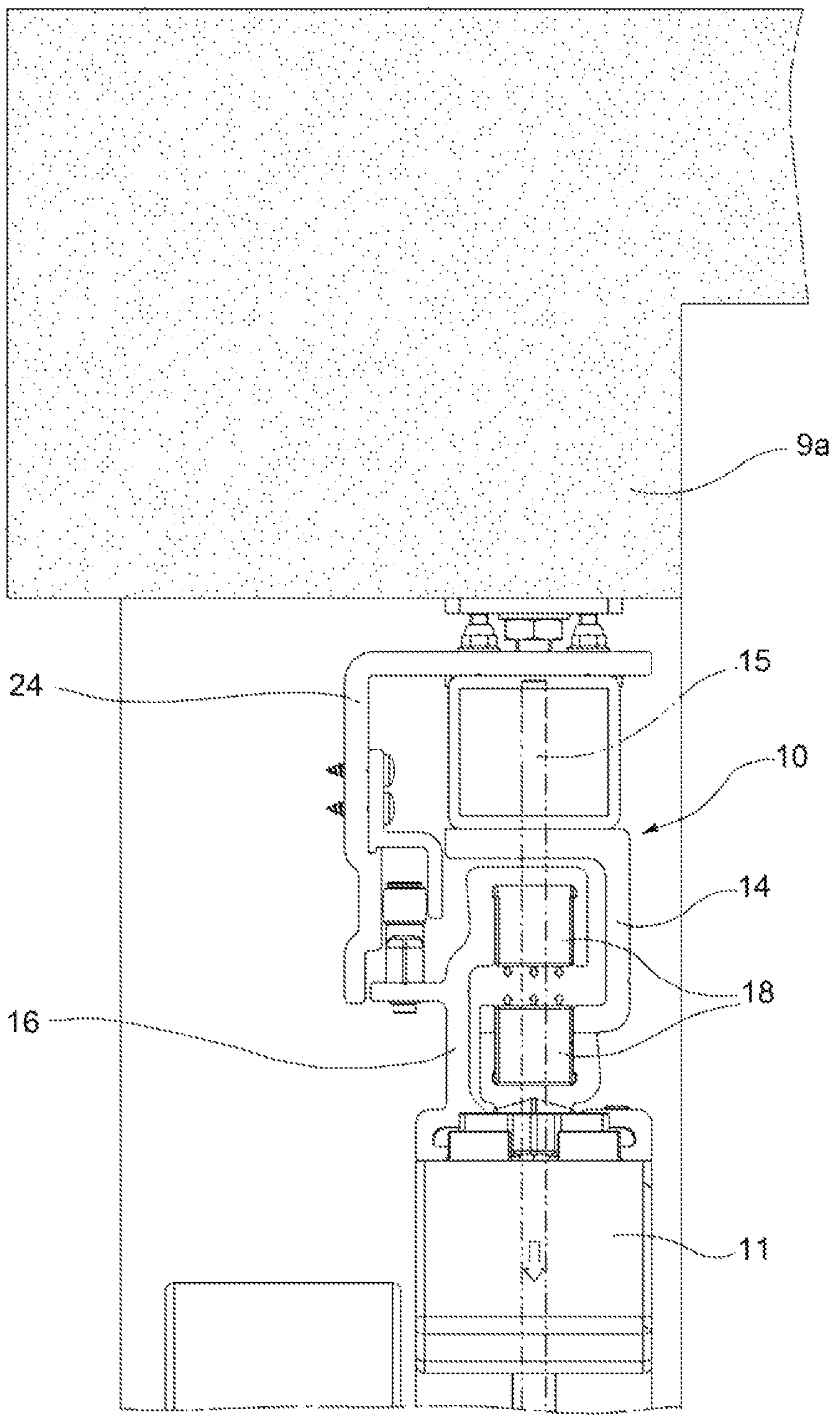
FIG. 3 is a schematic, front, cross-sectional front view of a guide, according to an embodiment of the present invention.
Figure 4:
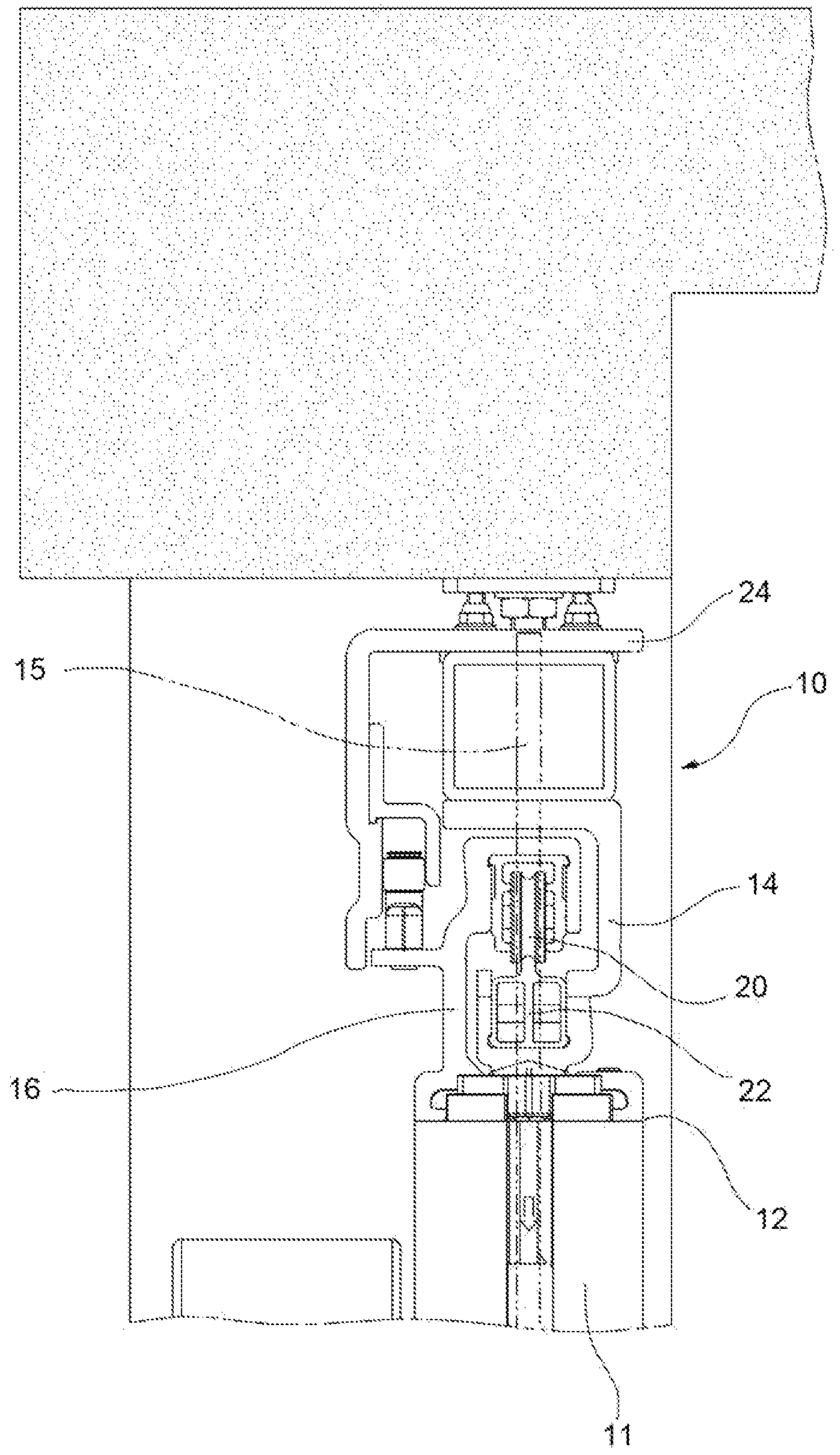
FIG. 4 is a schematic, front, cross-sectional view of a second embodiment of the present invention.

Optionally, as can be seen in FIG. 3, the guide bars 14, 16 carry a pair of magnets 18 facing each other; in the example shown, the magnets are arranged so that their polarities repel each other, such that the two bars 14, 16 are spaced vertically by the repelling magnetic force. According to an alternative not shown, it is also possible to make use of the attractive force of the magnets, such that the guide bar 14, which is connected to the fixed support 24, keeps the other bar 16, which is fixed to the leaf 11, suspended from the ground.

According to an alternative embodiment, instead of the magnets 18, one of the two guide bars 14, 16 carries at least one rolling element 20 (in the example shown, a roller wheel rotating on a transverse pin fixed to the bar), said rolling element 20 being able to travel along the other bar. In the example visible in FIG. 4, the roller wheel 20 is carried by the first bar 14 (mounted on the fixed support 24).

Optionally, the roller wheel 20, which is carried by one of the bars 14, is slidable on a rail 22, which is carried by the other bar 16. The rail 22 may be formed so as to suitably guide the roller wheel: for example it may have a rounded projection with a shape substantially complementing the annular groove which may be present on the roller wheel (see FIG. 4 again).

According to one embodiment (shown for example in FIGS. 3 and 4), one of the two bars (preferably the second bar 16) may carry one or more secondary roller wheels (visible on the left of the magnets 18 or the rolling elements 20) rotatable about vertical axes and slidable inside guides connected to the fixed support 24. The presence of the secondary rollers helps in particular to stabilize the bars 14, 16, keeping them correctly aligned.

As already mentioned, the fixed support 24 which supports one of the guide bars 14, 16 may be in turn a third bar which can be fastened to a fixed structure (for example the counterframe of the door or window, the installation wall, etc.).

Figure 5:
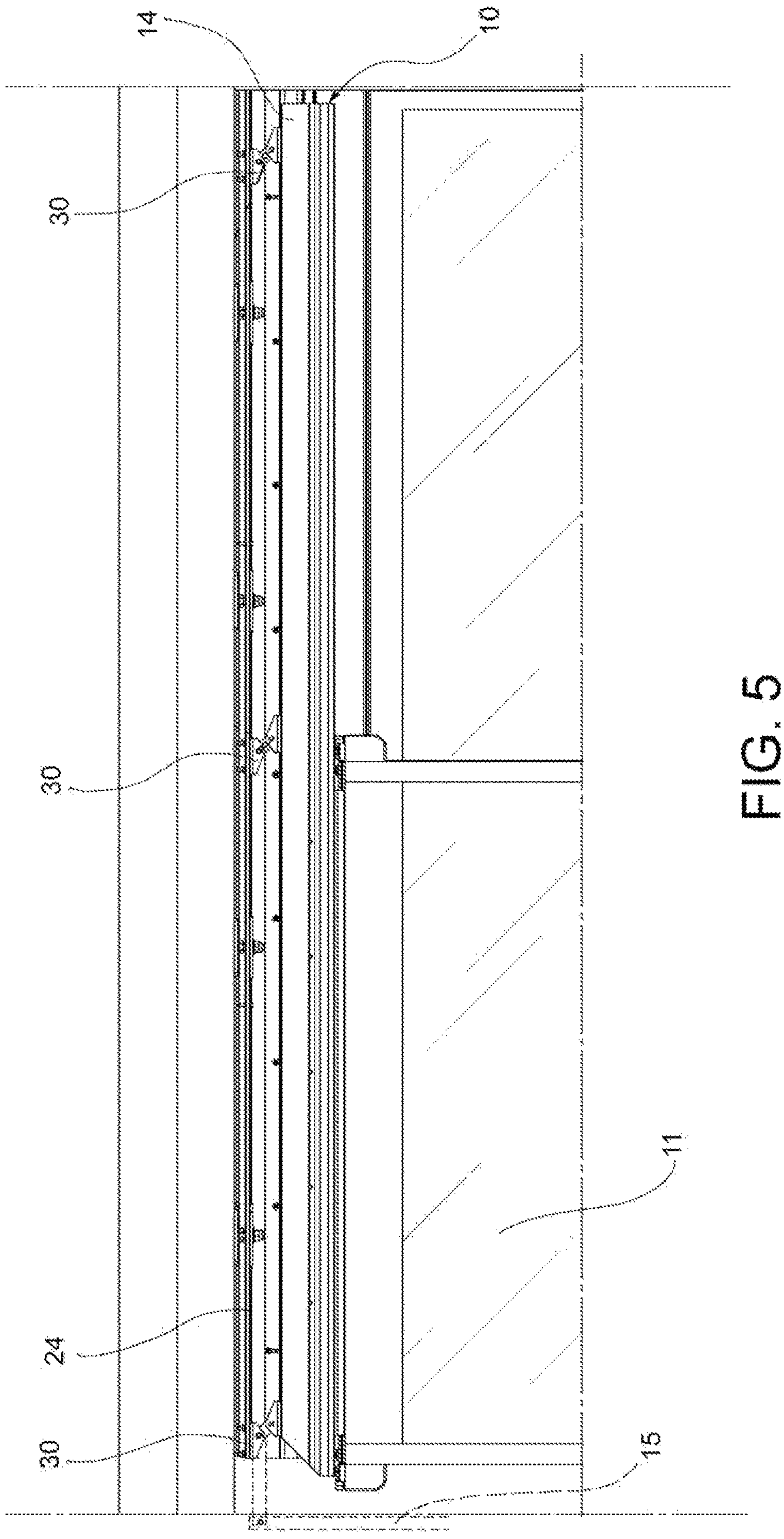
FIG. 5 is a schematic side view of a guide according to an embodiment of the present invention.
Figure 6:
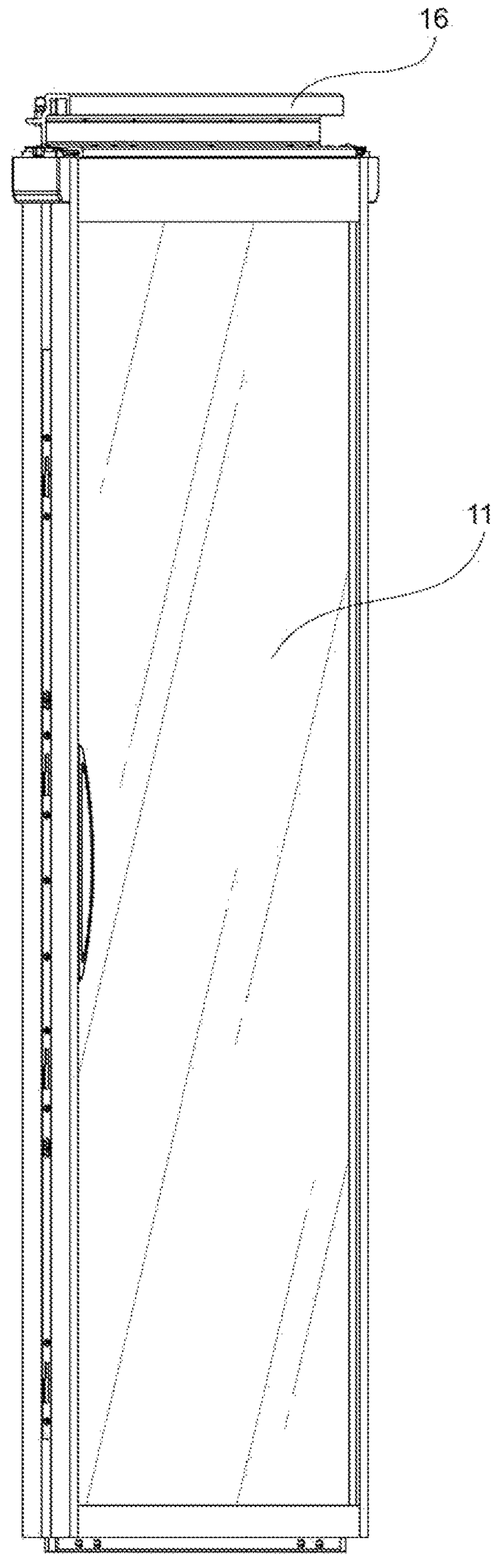
FIG. 6 is a perspective schematic view of a leaf and a bar of the guide fixed to the leaf.

FIG. 5 shows a possible solution for vertically lifting the first bar 14, for example by fitting a lever mechanism 30 which, as the person skilled in the art may understand, has one end connected to the fixed support 24 and the other end connected to the first bar 14. This latter end is rotatable, in the example shown here, relative to the first fixed end, and the pulling force exerted by the tie-rod 15 causes a pivoting movement of the first bar 14 such that the latter makes bearing contact in a lifted position. It is understood that the example shown does constitute the only way in which lifting of the first bar 14 may be performed.

According to an alternative (not shown) to the configuration described above, other pulling and lifting mechanisms may be used to move the first bar 14, for example jacks, threaded connections, etc., both of the manual and of the semi-automatic or automatic type.

Moreover, where appropriate, the person skilled in the art will understand that a guide 10, configured in the manner of the examples described and illustrated, may be easily multiplied in the structure, namely may have several pairs (for example two pairs, in a manner not shown) of guide bars 14, 16 which are spaced transversely along the thickness of the leaf 11.

With a guide 10 configured according to the present invention, the liftable sliding leaf 11 is able to slide on a support raised from the ground (without the drawbacks of a guide located on the floor), while being able to rest on the ground when it is in predetermined positions (for example the closed position).

The advantage achieved is that of obtaining a system which allows a liftable sliding leaf to be moved at the top, without having to provide complex locking mechanisms (if need be, the weight of the leaf is sufficient). Moreover, with a system configured in this way it is possible, compared to the solutions with liftable sliding leaves according to the prior art, to use leaves which have a smaller transverse thickness, this resulting in substantial benefits associated with the weight of the leaf (easier to use, less difficult assembly and transport, etc.) and the materials (lower manufacturing costs) and in a more attractive appearance.

Different aspects and embodiments of a guide for a liftable sliding leaf, a liftable leaf sliding on a guide, and a door or window comprising this leaf, according to the invention, have been described. It is understood that each embodiment may be combined with any other embodiment. The invention, moreover, is not limited to the embodiments described, but may be varied within the scope defined by the accompanying claims.

The invention claimed is:

1. A guide for liftable sliding leaf, the guide comprises:

at least two guide bars, a first bar of the at least two guide bars being able to be connected movably to a fixed support bar, the liftable sliding leaf being movable with respect to the fixed support bar, and a second bar of the at least two guide bars being able to be connected to a top part of the liftable sliding leaf and being movable integrally with said liftable sliding leaf;

both said first and second bars being liftable in a vertical plane from a first position, in which the liftable sliding leaf rests on the ground and movement thereof is locked, to a lifted position, in which the liftable sliding leaf is free to slide laterally, wherein the second bar is a rigid member, elongated along the whole top edge of the liftable sliding leaf.

2. The guide according to claim 1, comprising a lever mechanism or pulling and lifting mechanisms, connected to the first bar and adapted to move said first bar.

3. The guide according to claim 2, wherein the first bar carries a first magnet and the second bar carries a second magnet, the first and second magnets positioned as a pair of magnets facing each other.

4. The guide according to claim 2, wherein one guide bar of the first bar or the second bar of the at least two guide bars carries at least one rolling element slidable on the other guide bar of the first bar or the second bar.

5. The guide according to claim 4, wherein the at least one rolling element, carried by the one guide bar, is slidable on a rail, carried by the other guide bar.

6. The guide according to claim 1, wherein the first bar carries a first magnet and the second bar carries a second magnet, the first and second magnets positioned as a pair of magnets facing each other.

7. The guide according to claim 1, wherein one guide bar of the first bar or the second bar of the at least two guide bars carries at least one rolling element slidable on the other guide bar of the first bar or the second bar.

8. The guide according to claim 7, wherein the at least one rolling element, carried by the one guide bar, is slidable on a rail, carried by the other guide bar.

9. The guide according to claim 1, wherein the at least two guide bars are substantially mutually complementary, each guide bar having an L-shaped or a C-shaped cross-section, and aligned vertically.

10. The guide according to claim 1, wherein the first bar carries a first magnet and the second bar carries a second magnet, the first and second magnets positioned as a pair of magnets facing each other, and the second bar carries at least one rolling element slidable on the first bar.

11. A sliding door or window, comprising:

a liftable sliding leaf and a guide for liftable sliding leaf comprising:

at least two guide bars, a first bar of the at least two guide bars being able to be connected movably to a fixed support bar, the liftable sliding leaf being movable with respect to the fixed support bar, and a second bar of the at least two guide bars being able to be connected to a top part of the liftable sliding leaf and being movable integrally with said liftable sliding leaf;

both said first and second bars being liftable in a vertical plane from a first position, in which the liftable sliding leaf rests on the ground and movement thereof is locked, to a lifted position, in which the liftable sliding leaf is free to slide laterally, wherein the second bar is a rigid member, elongated along the whole top edge of the liftable sliding leaf, and wherein said liftable sliding leaf is slidable on said guide and is lockable in said first position.

12. The sliding door or window according to claim 11, wherein the at least two guide bars and the liftable sliding leaf are mutually aligned in a vertical direction and do not laterally project out of an opening in a wall which is to be closed by the sliding door or window.

* * * * *